April 15, 1941.   E. F. COOPER   2,238,679
PORTABLE SPOT WELDING APPARATUS
Filed Aug. 15, 1939
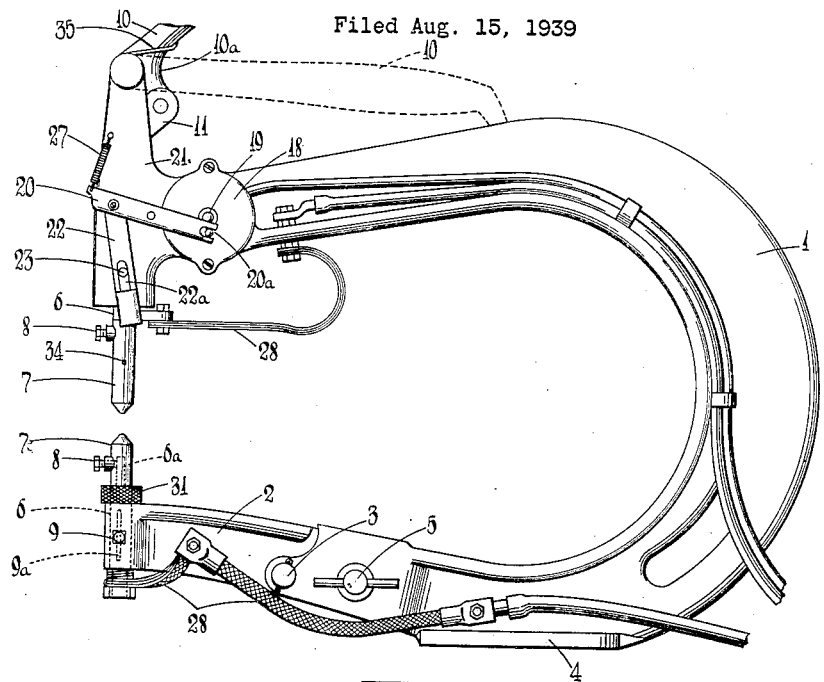
Fig-1-
Fig-2-
Fig-3-
Inventor,
E. F. Cooper
By: Glascock Downing & Seebold
Attys.

Patented Apr. 15, 1941

2,238,679

UNITED STATES PATENT OFFICE 2,238,679

PORTABLE SPOT WELDING APPARATUS

Edward Frank Cooper, Auckland, Auckland, New Zealand

Application August 15, 1939, Serial No. 290,298
In New Zealand August 19, 1938

3 Claims. (Cl. 219—4)

The invention relates to spot welding apparatus of the portable type, and has for its object the provision of an improved form thereof, particularly adapted for giving increased accessibility to parts to be united by welding, as in the manufacture and repair of automobile bodies and parts thereof, and other constructions.

The improved welding apparatus, according to the invention, is provided with welding bits mounted to receive between them, the parts to be welded, one of said bits being movable towards, and from the other bit, said apparatus being characterised, by the bits being brought into contact with the parts to be welded, the primary circuit through the apparatus closed, pressure applied to said parts by the bits, and the primary circuit opened, by the one and the same movement of an operating lever.

The improved apparatus is illustrated in the accompanying drawing and will be fully described in conjunction therewith, Figure 1 being a side elevation of the apparatus, Figure 2 a front view of same (partly in section), and Figure 3 a part side view thereof, on an enlarged scale.

In a suitable form the improved apparatus comprises an approximately U-shaped frame and consisting of members 1 and 2 hinged together at 3, the member 1 being provided with a base or flat portion 4, by means of which the apparatus can be supported where required, or secured to a bench or the like if necessary.

A locking pin 5 is provided adjacent the hinged joint 3, between said members 1 and 2 for locking the member 2 against movement on the member 1, said pin 5 being removable to enable said members 1 and 2 to be moved apart to give access to parts to be welded, following which the members 1 and 2 are relocked by the pin 5 in the positions shown. If necessary, "offset" or specially shaped or formed members 2, can be provided for use with the member 1, to afford increased accessibility of the apparatus, to the work to be done.

Holders 6 for opposed welding bits 7, which serve as electrodes, are provided at the ends of said hinged members 1 and 2, the bits 7 being retained on the reduced ends 6a of said holders 6 by means of set screws 8, so that they are presented to each other to provide points between which welding of the parts to be united, can be carried out.

One of the bit holders 6 is adjustable by a knurled nut 31 screwing thereon, through the member 2 on which it is provided, so as to enable the distance between the points of the bits 7 to be increased or decreased as required, according to the thicknesses of the material or parts to be united by the welding operation, a screw 9 inserted in the member 2 and entered in a keyway 9a in the holder 6, preventing turning movement of the latter in the member 2, and also serving as a lock screw.

The member 1 of the frame has mounted in a bracket 21 thereon, an operating lever 10 having an arm 10a connected by links 11 with a slide 12 which is operable in a guide 13 in the bracket 21, said slide 12 containing an inner sliding member 14 between which and the upper end of the slide 12, a spring 15 in compression is fitted.

The holder 6 for the upper bit 7 is carried by said inner sliding member 14, and is insulated therefrom by insulation 16, while a stop 17 on the sliding member 14 is provided to limit downward movement thereon, of the slide 12.

Insulation is also provided at 16a between the slide 12 and the stop 17 of the inner sliding member 14, so that said parts cannot make electrical contact with each other.

A switch 18 in the primary circuit of the transformer of the apparatus, is mounted on the member 1 of the frame thereof, the knob 19 or manipulative part of said switch 18 being engaged by the slotted end 20a of a lever 20 pivotally mounted at about its centre on the bracket 21, the other end of said lever 20 being connected by a bar 22 with a spring pressed catch 23 on the slide 12, said catch 23 being adapted to enter a recess 24 in the inner sliding member 14 in the slide 12, when required.

The housing 29 for the spring pressed catch 23 is slidable in a vertical slot 30 in the bracket 21, and when said catch 23 is not entered in the recess 24, its stem is entered in the closed slot 22a in the connecting bar 22.

The slotted lever 20 which engages the knob 19 or manipulative part of the switch 18, is connected with the slotted bar 22 by a pin 25 carried by an eccentric 26 turnable in said lever 20, and capable of being set therein, to vary movement imparted to the lever 20 from the slotted bar 22, said lever 20 also being actuated by a tension spring 27, so that when released, it returns to its normal position, in which the switch 18 is open.

The sequence of operations resulting from downward movement of the operating lever 10 is as follows:

Initial downward movement of the lever 10 which is normally kept raised by a spring 35 forces the slide 12 and the upper bit 7 downwards, whereby both bits 7 make contact with the parts to be welded together, the pressure obtained from the spring 15 acting on the inner sliding member 14 in the slide 12, to maintain all necessary surfaces in firm contact with each other, for the passage of the high amperage or welding current through the bits 7 from a suitable source via electrical connections 28 made therewith in any approved manner, said connections 28 being flexible to permit movement of the holders and bits.

Further downward movement of the operating lever 10 causes the primary circuit of the transformer to be closed through the switch 18, by the slotted end 20a of the lever 20 being moved upwards. The operating lever 10 is held in this position for sufficient time to allow the parts to be welded, to be heated to welding temperature. When the desired heat is obtained, the operating lever 10 is pressed right home or fully down with one quick movement, the effect of which is that the slide 12, is forced downwards on the inner sliding member 14 far enough for the sliding spring catch 23 on the slide 12 to slip into the recess 24 provided for it in the inner sliding member 14, and so disengage itself from the slotted bar 22, by drawing its stem out of the slot 22a therein, following which the switch 18 is returned to the "off" position, by the spring 27 acting on the slotted lever 20 to move the slotted end 20a thereof downwards, and practically simultaneously therewith the slide 12 reaches its full limit of downward movement on the inner sliding member 14, and by engaging the stop 17 thereon renders the spring 15 inactive.

The links 11 which connect the arm 10a of the operating lever 10 with the slide 12 are now almost vertical or in a position wherein high pressure is exerted on the metal parts between the bits 7, so that welding is accomplished under and by pressure.

The bits 7 are of copper and easily and cheaply replaceable, and are also interchangeable.

Off-set and specially shaped bits can be fitted in accordance with the requirements of tasks not capable of being performed with ordinary bits.

Where the points of the welding bits 7 are apt to become overheated due to continuous use of the apparatus, cooling of said points can be effected by the use of compressed air or other approved means, and as illustrated in the drawing, air for cooling purposes, can be led through a flexible pipe line 32 to the upper holder 6, which with the upper bit 7 is bored as at 33 to permit the passage of air therethrough, the air finally escaping through holes 34 in the bit.

What I do claim and desire to obtain by Letters Patent of the United States of America is:

1. In electric welding apparatus, hinged frame members, an electrode carried by one frame member, a slide member movably supported on the other frame member, a second slide member movable with respect to the first slide member, a second electrode carried by the second slide member, a switch, a spring-biased lever for opening said switch, a bar connected to said lever, a catch engaging said bar for maintaining the switch closed, and means for releasing the catch from said bar when the second slide member is moved relative to the first slide member.

2. A welding apparatus according to claim 1 wherein the bar is pivotally connected to said lever by a pin mounted eccentrically in the lever.

3. In electric welding apparatus, hinged frame members, an electrode carried by one frame member, a slide member movably supported on the other frame member, a second slide member movable with respect to the first slide member, a second electrode carried by the second slide member, a switch, a spring-biased lever for opening said switch, a bar pivotally connected to said lever, said second slide member having a recess therein, a pin carried by the first slide member adjacent said recess and engaging said bar to maintain the switch in a closed position, and yieldable means for moving said pin into said recess to release the pin from engagement with the bar when the first slide member is moved relative to the second slide member.

EDWARD FRANK COOPER.